United States Patent
Addison et al.

(10) Patent No.: US 12,433,578 B2
(45) Date of Patent: Oct. 7, 2025

(54) SEALANT INJECTION NEEDLE ASSEMBLY AND SEALANT DELIVERY APPARATUS FOR USE IN A LUNG ACCESS PROCEDURE

(71) Applicant: BARD PERIPHERAL VASCULAR, INC., Franklin Lakes, NJ (US)

(72) Inventors: Jordan P. Addison, Gilbert, AZ (US); Heather A. Storm, Phoenix, AZ (US); Chad Van Liere, Phoenix, AZ (US)

(73) Assignee: Bard Peripheral Vascular, Inc., Franklin Lakes, NJ (US)

( * ) Notice: Subject to any disclaimer, the term of this patent is extended or adjusted under 35 U.S.C. 154(b) by 612 days.

(21) Appl. No.: 17/906,421

(22) PCT Filed: Mar. 20, 2020

(86) PCT No.: PCT/US2020/023761
§ 371 (c)(1),
(2) Date: Sep. 15, 2022

(87) PCT Pub. No.: WO2021/188112
PCT Pub. Date: Sep. 23, 2021

(65) Prior Publication Data
US 2023/0172597 A1 Jun. 8, 2023

(51) Int. Cl.
*A61B 17/00* (2006.01)
*A61M 5/158* (2006.01)
(Continued)

(52) U.S. Cl.
CPC *A61B 17/0057* (2013.01); *A61B 2017/00495* (2013.01); *A61B 2017/0065* (2013.01);
(Continued)

(58) Field of Classification Search
CPC .. A61B 2017/0065; A61B 2017/00495; A61B 17/8819; A61M 5/19; A61M 5/284;
(Continued)

(56) References Cited

U.S. PATENT DOCUMENTS 6,033,411 A * 3/2000 Preissman .......... A61B 17/8819
604/165.01
6,500,152 B1 12/2002 Illi
(Continued)

FOREIGN PATENT DOCUMENTS

CN 109965834 A 7/2019
WO 2004091670 A2 10/2004
(Continued)

OTHER PUBLICATIONS

Japanese Office Action dated Jan. 19, 2024 pertaining to Japanese application No. 2022-556013 filed Sep. 19, 2022, pp. 1-8.
(Continued)

*Primary Examiner* — Nathan R Price
(74) *Attorney, Agent, or Firm* — Dinsmore & Shohl LLP

(57) ABSTRACT

A sealant injection needle assembly includes a cannula assembly and a stylet assembly. The cannula assembly has a cannula hub and a cannula having a first longitudinal sealant passage and a second longitudinal sealant passage. The first longitudinal sealant passage has a first proximal sealant port and a first distal sealant port. The second longitudinal sealant passage has a second proximal sealant port and a second distal sealant port. The stylet assembly has a stylet advance hub and a stylet configured for longitudinal movement in a lumen of the cannula. The stylet has a first stage position and a second stage position. The stylet has a first exterior circumvolving channel longitudinally spaced apart from the second exterior circumvolving channel that are separately selectively and sequentially positionable in fluid communication with both of the first distal sealant port and the second distal sealant port of the cannula.

22 Claims, 9 Drawing Sheets

(51) Int. Cl.
    *A61M 5/19*      (2006.01)
    *A61M 25/00*      (2006.01)
    *A61M 25/01*      (2006.01)

(52) U.S. Cl.
    CPC ............ *A61M 5/1582* (2013.01); *A61M 5/19* (2013.01); *A61M 2025/004* (2013.01); *A61M 2025/0175* (2013.01); *A61M 2205/582* (2013.01)

(58) Field of Classification Search
    CPC .... A61M 2025/0039; A61M 2025/004; A61M 5/1582; A61M 5/3297
    See application file for complete search history.

(56) References Cited

U.S. PATENT DOCUMENTS

| | | | |
|---|---|---|---|
| 6,540,716 | B1 | 4/2003 | Holm |
| 6,702,760 | B2 | 3/2004 | Krause et al. |
| 6,770,070 | B1 | 8/2004 | Balbierz |
| 6,802,822 | B1 | 10/2004 | Dodge |
| 7,766,891 | B2 | 8/2010 | Mcgurk et al. |
| 7,766,938 | B2 | 8/2010 | Mcgurk et al. |
| 8,821,376 | B2 | 9/2014 | Tolkowsky |
| 9,125,671 | B2 * | 9/2015 | Germain ............ A61B 17/8811 |
| 10,206,686 | B2 | 2/2019 | Swayze et al. |
| 10,219,794 | B2 | 3/2019 | Young et al. |
| 10,272,260 | B2 | 4/2019 | Kaplan et al. |
| 10,300,223 | B2 | 5/2019 | Davis |
| 10,369,339 | B2 | 8/2019 | Roschak |
| 2006/0025815 | A1 | 2/2006 | Mcgurk et al. |
| 2008/0109033 | A1 | 5/2008 | Razavi |
| 2010/0121268 | A1 | 5/2010 | Keller |
| 2010/0217231 | A1 | 8/2010 | Tan et al. |
| 2011/0071432 | A1 | 3/2011 | Carrillo, Jr. et al. |
| 2012/0316513 | A1 * | 12/2012 | Sharkey ............. A61B 17/7098 604/272 |
| 2013/0023833 | A1 * | 1/2013 | Kayser ............. B05C 17/00513 604/218 |
| 2013/0225996 | A1 | 8/2013 | Dillard et al. |
| 2013/0226026 | A1 | 8/2013 | Dillard et al. |
| 2015/0374936 | A1 | 12/2015 | Davis |
| 2016/0007975 | A1 | 1/2016 | Kim et al. |
| 2016/0120528 | A1 | 5/2016 | Abtin |
| 2016/0166807 | A1 | 6/2016 | De Stefano et al. |
| 2019/0099197 | A1 | 4/2019 | Boyle, Jr. et al. |
| 2019/0125435 | A1 | 5/2019 | Dickhans et al. |
| 2019/0269933 | A1 | 9/2019 | Kaplan et al. |

FOREIGN PATENT DOCUMENTS

| | | | |
|---|---|---|---|
| WO | 2008010905 A2 | 1/2008 | |
| WO | WO-2011137377 A1 * | 11/2011 | ......... A61B 17/8819 |
| WO | 2015093274 A1 | 6/2015 | |

OTHER PUBLICATIONS

International Search Report and Written Opinion dated Oct. 30, 2020, in International Application No. PCT/US2020/023761.

* cited by examiner

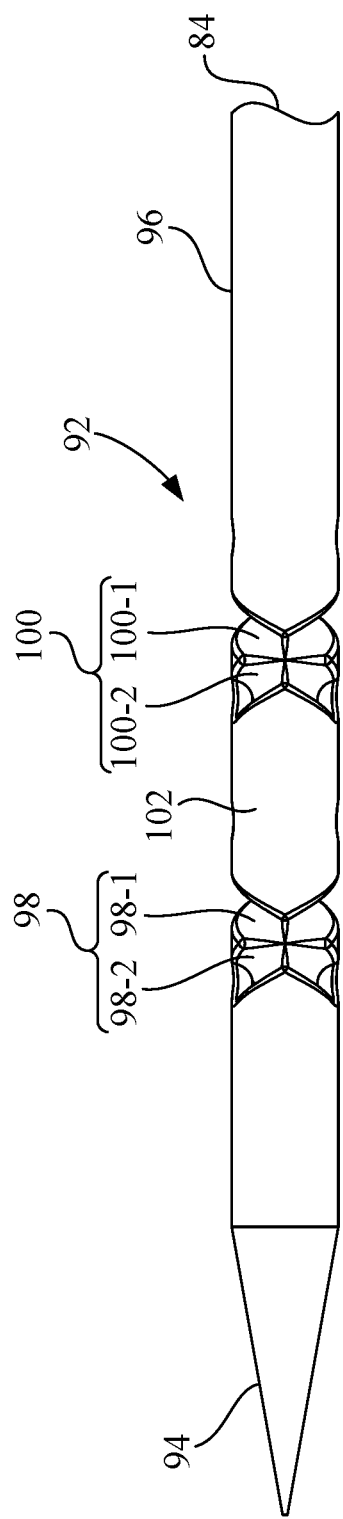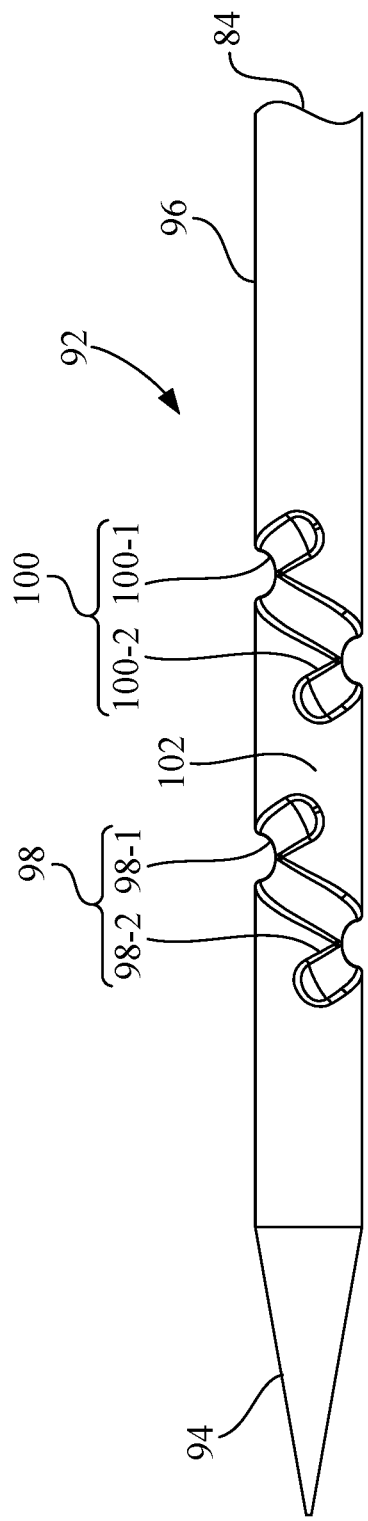

SEALANT INJECTION NEEDLE ASSEMBLY AND SEALANT DELIVERY APPARATUS FOR USE IN A LUNG ACCESS PROCEDURE

CROSS-REFERENCE TO RELATED APPLICATIONS

This application is a U.S. National Phase of International Application No. PCT/US2020/023761, entitled "Sealant Injection Needle Assembly And Sealant Delivery Apparatus for Use in a Lung Access Procedure" and filed Mar. 20, 2020, which is incorporated herein by reference in its entirety.

TECHNICAL FIELD

The present disclosure relates to a lung access procedure, such as a lung biopsy, and, more particularly, to a sealant injection needle assembly and sealant delivery apparatus for use in a lung access procedure to aid in preventing pneumothorax.

BACKGROUND ART

Pneumothorax is a problematic complication of the lung biopsy procedure where air or fluid is allowed to pass into the pleural space as a result of the puncture of the parietal pleura and visceral pleura. Pneumothorax and, more so, pneumothorax requiring chest tube placement, are significant concerns for clinicians performing, and patients undergoing, percutaneous lung biopsies. The incidence of pneumothorax in patients undergoing percutaneous lung biopsy has been reported to be anywhere from 9-54%, with an average of around 15%. On average, 6.6% of all percutaneous lung biopsies result in pneumothorax requiring a chest tube to be placed, which results in an average hospital stay of 2.7 days.

Factors that increase the risk of pneumothorax include increased patient age, obstructive lung disease, increased depth of a lesion, multiple pleural passes, increased time that an access needle lies across the pleura, and traversal of a fissure. Pneumothorax may occur during or immediately after the procedure, which is why typically a CT scan of the region is performed following removal of the needle. Other, less common, complications of percutaneous lung biopsy include hemoptysis (coughing up blood), hemothorax (a type of pleural effusion in which blood accumulates in the pleural cavity), infection, and air embolism.

It is known to attempt to apply a sealant to a region near the pleura layers of a patient to prevent pneumothorax. Such procedures typically require a positioning of the device using positioning imaging scans. However, sometimes the time required for the positioning imaging scans competes with the gelling time of the adhesive, and the user has to remove the stylet and replace it with a new one to proceed, potentially moving the needle reference and adding time to the procedure.

What is needed in the art is a sealant injection needle assembly and sealant delivery apparatus having multi-stage sealing capability for use in a lung access procedure to aid in preventing pneumothorax.

SUMMARY

The present disclosure provides a sealant injection needle assembly and sealant delivery apparatus having multi-stage sealing capability for use in a lung access procedure to aid in preventing pneumothorax.

The present disclosure, in one form, is directed to a sealant injection needle assembly for use with a syringe-type applicator having a first sealant component chamber and a second sealant component chamber. The sealant injection needle assembly includes a cannula assembly and a stylet assembly. The cannula assembly has a cannula hub and a cannula. The cannula has a lumen and a distal end. The cannula hub is fixedly connected to the cannula. The cannula has a first longitudinal sealant passage and a second longitudinal sealant passage. The first longitudinal sealant passage has a first proximal sealant port and a first distal sealant port. The second longitudinal sealant passage has a second proximal sealant port and a second distal sealant port. The first proximal sealant port is configured for fluid communication with the first sealant component chamber, and the second proximal sealant port is configured for fluid communication with the second sealant component chamber. The stylet assembly has a stylet advance hub and a stylet. The stylet advance hub is fixedly connected to the stylet. The stylet is configured for longitudinal movement in the lumen of the cannula. The stylet has a first stage position and a second stage position. The stylet has an outer surface that includes a first exterior circumvolving channel and a second exterior circumvolving channel. The first exterior circumvolving channel is longitudinally spaced apart from the second exterior circumvolving channel. When the stylet is in the first stage position, the first exterior circumvolving channel of the stylet is in fluid communication with both of the first distal sealant port and the second distal sealant port of the cannula. When the stylet is in the second stage position, the second exterior circumvolving channel of the stylet is in fluid communication with both of the first distal sealant port and the second distal sealant port of the cannula.

The present disclosure, in another form, is directed to a sealant injection needle assembly for ejecting a multi-component sealant. The sealant injection needle assembly includes a cannula having a proximal portion, a distal portion, a distal end, and a side wall that surrounds a lumen. The side wall has a first longitudinal sealant passage and a second longitudinal sealant passage, wherein each of the first longitudinal sealant passage and the second longitudinal sealant passage extends from the proximal portion to the distal portion. The first longitudinal sealant passage has a first proximal sealant port and a first distal sealant port. The first proximal sealant port is configured for fluid communication with a first sealant component of the multi-component sealant. The first distal sealant port is located at the distal portion in fluid communication with the lumen of the cannula. The second longitudinal sealant passage has a second proximal sealant port and a second distal sealant port. The second proximal sealant port is configured for fluid communication with a second sealant component of the multi-component sealant. The second distal sealant port is located at the distal portion in fluid communication with the lumen of the cannula. The stylet is configured for longitudinal movement in the lumen of the cannula between a first stage position and a second stage position. The stylet has an outer surface that includes a first exterior circumvolving channel and a second exterior circumvolving channel. The first exterior circumvolving channel is longitudinally spaced from the second exterior circumvolving channel. When the stylet is in the first stage position, each of the first distal sealant port and the second distal sealant port of the cannula is in fluid communication with an aft portion of the first exterior circumvolving channel of the stylet, and a fore portion of the first exterior circumvolving channel of the stylet is positioned distal to the distal end of the cannula.

When the stylet is in the second stage position, each of the first distal sealant port and the second distal sealant port of the cannula is in fluid communication with an aft portion of the second exterior circumvolving channel of the stylet, and a fore portion of the second exterior circumvolving channel of the stylet is positioned distal to the distal end of the cannula.

The present disclosure, in another form, is directed to a sealant delivery apparatus for use in a lung access procedure to aid in preventing pneumothorax. The sealant delivery apparatus includes a sealant applicator device, a cannula assembly, and a stylet assembly. The sealant applicator device has an actuator, a first sealant component chamber configured to carry a first sealant component of a multi-component sealant, and second sealant component chamber configured to carry a second sealant component of the multi-component sealant. The first sealant component chamber has a first applicator port, and the second sealant component chamber has a second applicator port. The cannula assembly has a cannula hub and a cannula that has a lumen and a distal end. The cannula hub is fixedly connected to the cannula. The cannula is configured to have a first longitudinal sealant passage and a second longitudinal sealant passage. The first longitudinal sealant passage has a first proximal sealant port and a first distal sealant port. The second longitudinal sealant passage has a second proximal sealant port and a second distal sealant port. The first proximal sealant port is configured for fluid communication with the first applicator port of the first sealant component chamber of the sealant applicator device. The second proximal sealant port is configured for fluid communication with the second applicator port of the second sealant component chamber of the sealant applicator device. The stylet assembly has a stylet advance hub, a stylet intermediate hub, and a stylet. The stylet intermediate hub is threadably interposed between the cannula hub and the stylet advance hub. The stylet advance hub is fixedly connected to the stylet. The stylet is configured for longitudinal movement in the lumen of the cannula. The stylet has a first stage position and a second stage position. The stylet has an outer surface that includes a first exterior circumvolving channel and a second exterior circumvolving channel. The first exterior circumvolving channel is longitudinally spaced apart from the second exterior circumvolving channel. When the stylet is in the first stage position, each of the first distal sealant port and the second distal sealant port of the cannula is in fluid communication with the first exterior circumvolving channel of the stylet, and a fore portion of the first exterior circumvolving channel of the stylet is positioned distal to the distal end of the cannula. When the stylet is in the second stage position, each of the first distal sealant port and the second distal sealant port of the cannula is in fluid communication with the second exterior circumvolving channel of the stylet, and a fore portion of the second exterior circumvolving channel of the stylet is positioned distal to the distal end of the cannula.

An advantage of the present disclosure is that the present disclosure reduces or avoids the need to replace used stylets or cannulas during a lung procedure due to premature curing of the sealant at the lung access pathway by providing multiple stages of sealing capability.

BRIEF DESCRIPTION OF DRAWINGS

The above-mentioned and other features and advantages of this disclosure, and the manner of attaining them, will become more apparent and the disclosure will be better understood by reference to the following description of an embodiment of the disclosure taken in conjunction with the accompanying drawings, wherein:

FIG. 10 is a side view of a distal end portion of the stylet of FIGS. 1 and 4-7, showing a first exterior circumvolving channel longitudinally separated from a second exterior circumvolving channel;

FIG. 11 is another side view of the distal end portion of the stylet of FIGS. 1 and 4-7, rotated 90 degrees from the orientation depicted in FIG. 10, and showing the first exterior circumvolving channel longitudinally separated from the second exterior circumvolving channel.

Corresponding reference characters indicate corresponding parts throughout the several views. The exemplifications set out herein illustrate at least one embodiment of the disclosure, and such exemplifications are not to be construed as limiting the scope of the disclosure in any manner.

DESCRIPTION OF EMBODIMENTS

Figure 1:
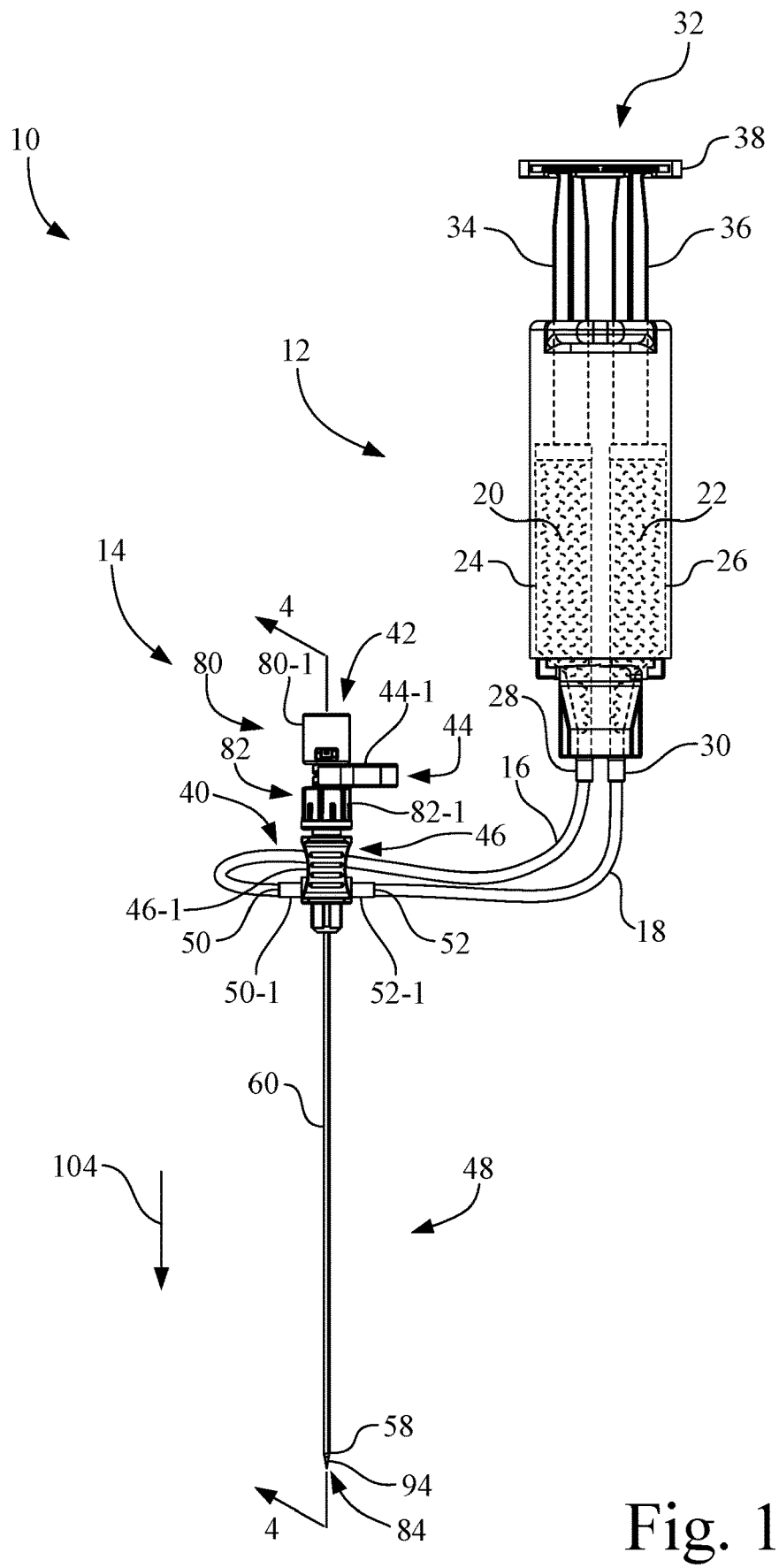
FIG. 1 is a perspective view of a sealant delivery apparatus for use in a lung access procedure to aid in preventing pneumothorax, which includes a sealant applicator device and a sealant injection needle assembly according to an aspect of the present disclosure, and including a safety member.

Referring now to drawings, and more particularly to FIG. 1, there is shown a sealant delivery apparatus 10 for use in a lung access procedure to aid in preventing pneumothorax. Sealant delivery apparatus 10 includes a sealant applicator device 12 and a sealant injection needle assembly 14. Sealant applicator device 12 is connected in fluid communication with sealant injection needle assembly 14 by way of flexible tube 16 and flexible tube 18.

Sealant applicator device 12 is a syringe-type applicator that is configured to separately carry each of a first sealant component 20 of a multi-component sealant and a second sealant component 22 of the multi-component sealant. When first sealant component 20 comingles with second sealant component 22, the resulting chemical reaction forms a sealant gel (i.e., the multi-component sealant) suitable to form a sealing region at the pleural layers of the patient, and along the access tract leading to the pleural layers and lung. First sealant component 20 may include, for example, at least two N-hydroxysuccinimide (NETS) ester groups, and second sealant component 22 may include, for example, at least two amine groups. For example, first sealant component 20 may be a solution containing polyethylene glycol (PEG) succinimidyl succinate and second sealant component 22 may be a solution containing albumin and/or polyethylenimine (PEI).

In the present embodiment, for example, sealant applicator device 12 is in the form of a syringe-type applicator having a first sealant component chamber 24 and a second sealant component chamber 26. First sealant component chamber 24 is configured to carry, and contain, first sealant component 20 of the multi-component sealant. Second sealant component chamber 26 is configured to carry, and contain, second sealant component 22 of the multi-component sealant. In the present embodiment, each of first sealant component chamber 24 and a second sealant component chamber 26 may be, for example, in the form of a cylinder, or a pair of cylinder bores in a common body.

Figure 2:
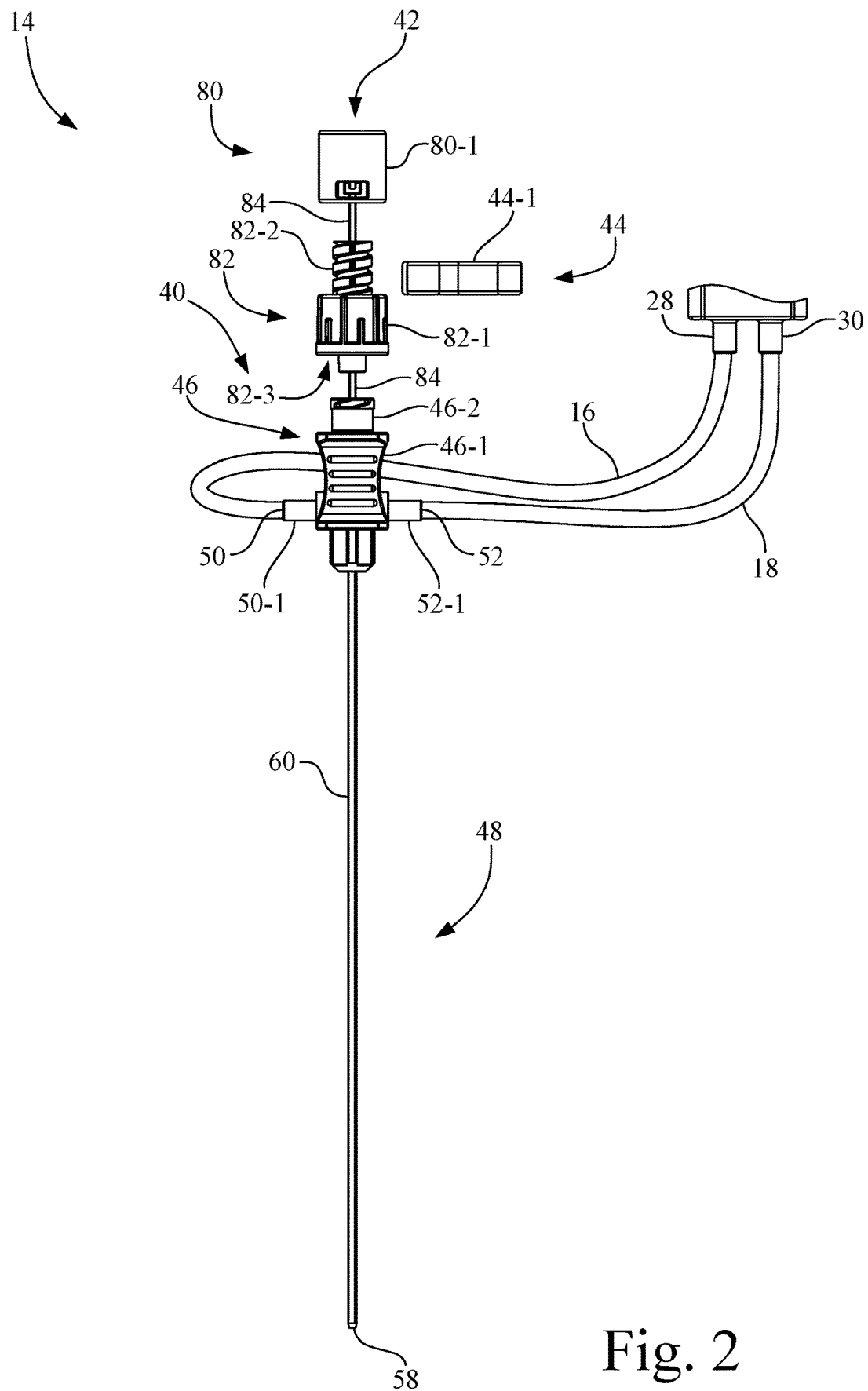
FIG. 2 is an exploded view of the sealant injection needle assembly of FIG. 1.

First sealant component chamber 24 has a first applicator port 28. Referring also to FIG. 2, first applicator port 28 is configured to be connected in fluid communication with a corresponding port in sealant injection needle assembly 14 via flexible tube 16.

Likewise, second sealant component chamber 26 has a second applicator port 30. Second applicator port 30 is configured to be connected in fluid communication with a corresponding port in sealant injection needle assembly 14 via flexible tube 18.

Sealant applicator device 12 further includes an actuator 32. In the present embodiment, actuator 32 of sealant applicator device 12 includes a first piston 34, a second piston 36, and a plunger handle 38. Plunger handle 38 is in the form of a link member that perpendicularly extends between, and is connected to, each of first piston 34 and second piston 36. First piston 34 is in the form of a plunger that is slidable within first sealant component chamber 24, and is located proximal to first sealant component 20 of the multi-component sealant. Second piston 36 is in the form of a plunger that is slidable within second sealant component chamber 26, and is located proximal to second sealant component 22 of the multi-component sealant.

Sealant injection needle assembly 14 includes a cannula assembly 40 and a stylet assembly 42. Optionally, sealant injection needle assembly 14 may also include a safety member 44.

Referring to FIGS. 2-6, cannula assembly 40 has a cannula hub 46 and a cannula 48. Cannula hub 46 is fixedly connected to cannula 48, e.g., by a press fit or by overmolding. Cannula hub 46 has a hub body 46-1 and a male threaded portion 46-2, wherein male threaded portion 46-2 extends proximally from hub body 46-1.

Figure 3:
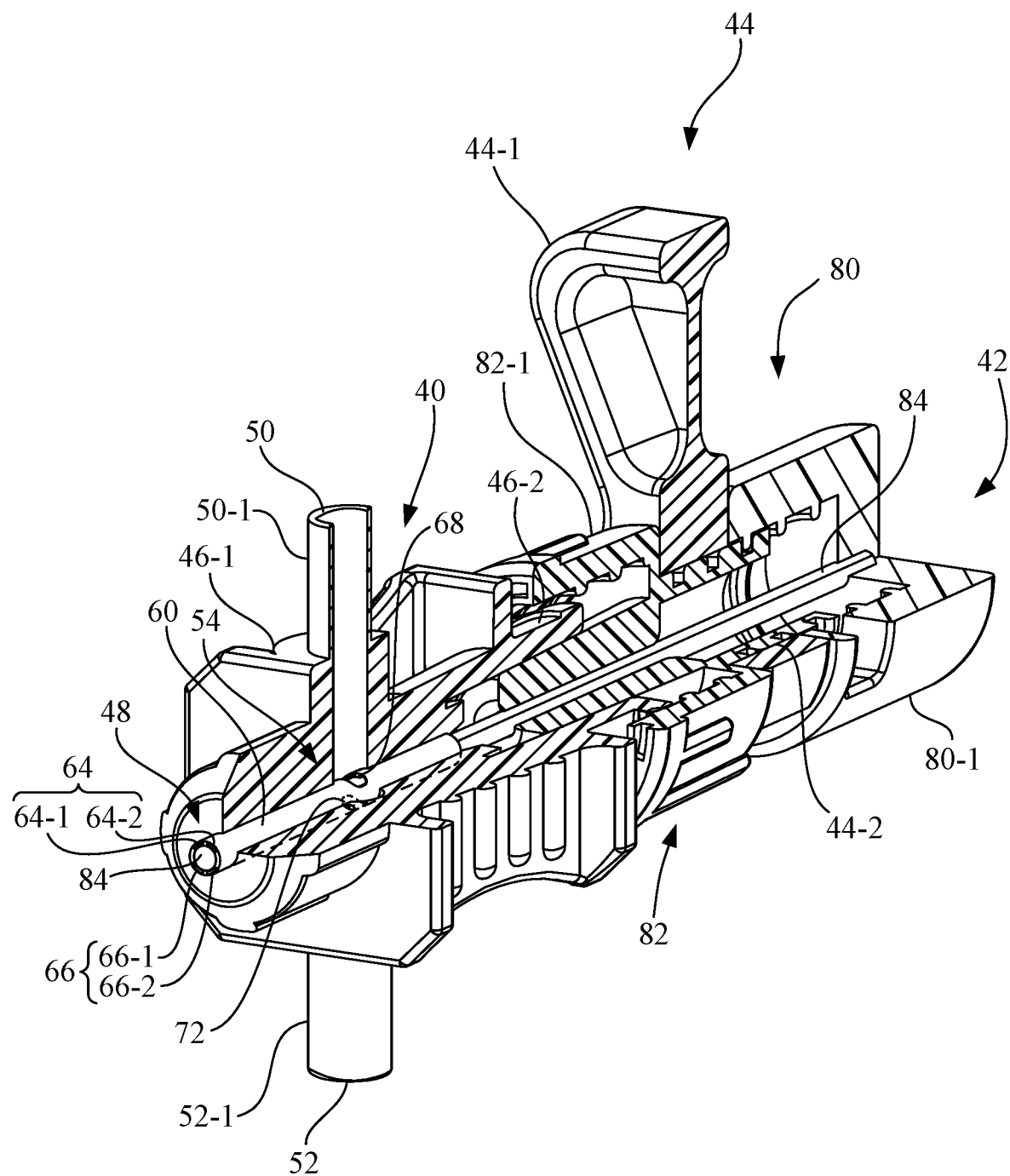
FIG. 3 is an enlarged perspective view of the hubs portion of the sealant injection needle assembly of FIG. 1, with a quarter-section removed.

Referring to FIGS. 1-3, cannula hub 46 has a first cannula hub port 50 and a second cannula hub port 52. First cannula hub port 50 and a second cannula hub port 52 are configured, e.g., as passageways, to facilitate fluid communication with cannula 48. First cannula hub port 50 has a tubular extension 50-1 and second cannula hub port 52 has a tubular extension 52-1. In the present embodiment, for example, tubular extension 50-1 and tubular extension 52-1 extend in opposite directions from hub body 46-1.

Referring to FIGS. 1 and 2, when sealant injection needle assembly 14 is fully assembled, tubular extension 50-1 of first cannula hub port 50 is connected via flexible tube 16 to first applicator port 28 of first sealant component chamber 24 of sealant applicator device 12, which carries first sealant component 20 of the multi-component sealant via flexible tube 16. Thus, first cannula hub port 50 facilitates fluid communication of sealant injection needle assembly 14 with first sealant component 20 of the multi-component sealant. Likewise, when sealant injection needle assembly 14 is fully assembled, tubular extension 52-1 of second cannula hub port 52 is connected via flexible tube 18 to second applicator port 30 of second sealant component chamber 26 that carries second sealant component 22 of the multi-component sealant. Thus, second cannula hub port 52 facilitates fluid communication of sealant injection needle assembly 14 so as to facilitate fluid communication with second sealant component 22 of the multi-component sealant.

Figure 7:
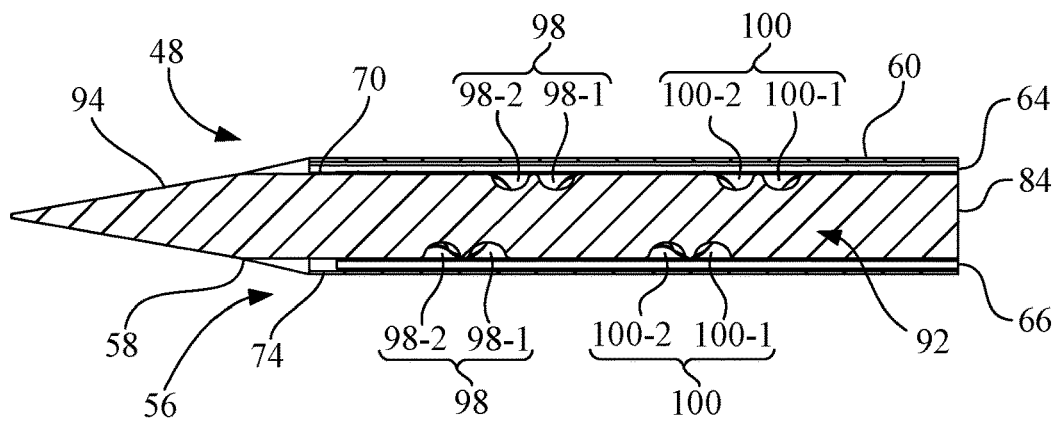
FIG. 7 is an enlargement of the distal portion of the cannula and stylet depicted in FIG. 4.
Figure 8:
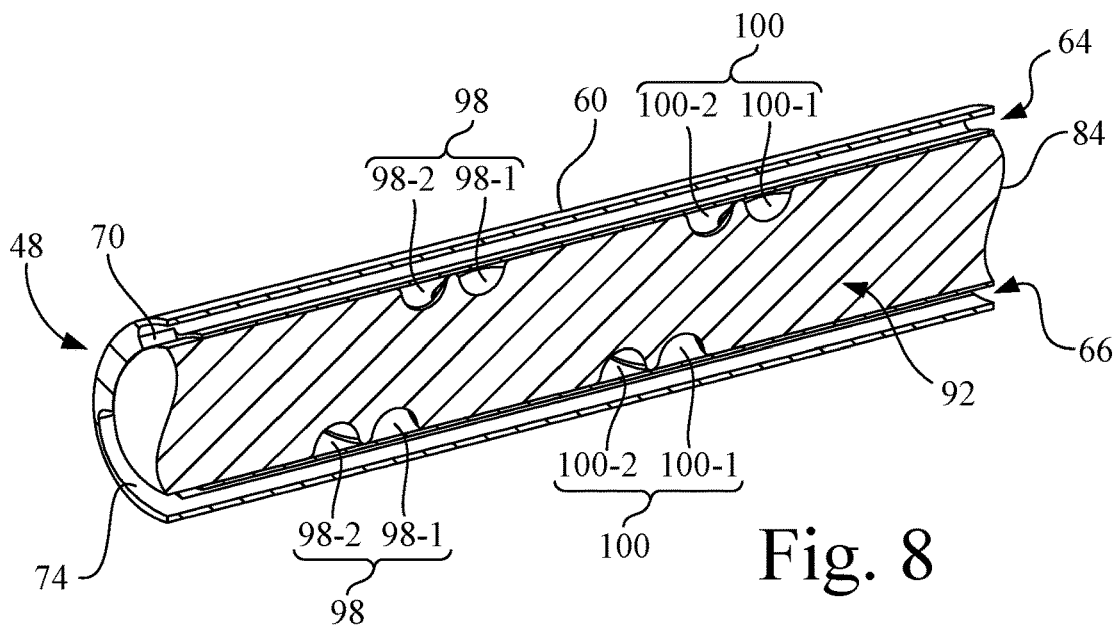
FIG. 8 is a perspective view of a further enlargement of a sectioned portion of the enlargement of FIG. 7.
Figure 9:
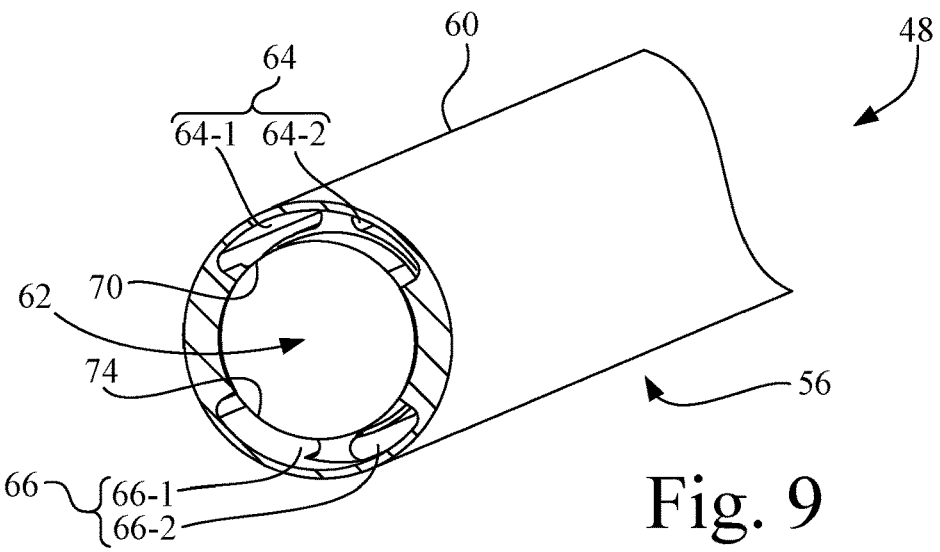
FIG. 9 is a perspective view of a further enlargement of a sectioned portion of the cannula of the cannula assembly of FIGS. 1-8.

Referring to FIGS. 3-6, cannula 48 has a proximal portion 54, a distal portion 56, a distal end 58, and a side wall 60 that surrounds a lumen 62 (see FIG. 9). Referring also to FIGS. 7-9, side wall 60 has a first longitudinal sealant passage 64 and a second longitudinal sealant passage 66. More particularly, in the present embodiment, first longitudinal sealant passage 64 and second longitudinal sealant passage 66 are located in, and are surrounded by, the side wall 60 of cannula 48. Each of first longitudinal sealant passage 64 and second longitudinal sealant passage 66 extends from proximal portion 54 to distal portion 56. Also, in the present embodiment as best shown in FIGS. 3 and 7-9, first longitudinal sealant passage 64 is configured as a pair of passages 64-1, 64-2, and likewise, second longitudinal sealant passage 66 is configured as a pair of passages 66-1, 66-2.

Referring to FIGS. 3-9, first longitudinal sealant passage 64 has a first proximal sealant port 68 and a first distal sealant port 70. First proximal sealant port 68 of cannula 48 is coupled in fluid communication with first cannula hub port 50 of cannula hub 46. In the present embodiment, first proximal sealant port 68 is configured as an arcuate opening that connects the individual passages 64-1, 64-2 of the pair of passages 64-1, 64-2 of first longitudinal sealant passage 64 together in fluid communication at proximal portion 54, and as best shown in FIG. 3, connects the pair of passages 64-1, 64-2 to first cannula hub port 50 of cannula hub 46 in fluid communication.

Accordingly, referring to FIGS. 1-3, first proximal sealant port 68 is coupled via first cannula hub port 50 of cannula hub 46 and flexible tube 16 to, and in fluid communication with, first applicator port 28 of first sealant component chamber 24 that carries first sealant component 20 of the multi-component sealant via flexible tube 16. Thus, first proximal sealant port 68 of first longitudinal sealant passage 64 of cannula 48 is configured for fluid communication with first applicator port 28 of first sealant component chamber 24 and with first sealant component 20 of the multi-component sealant.

Referring to FIGS. 7 and 9, first distal sealant port 70 of first longitudinal sealant passage 64 of cannula 48 is located at distal portion 56 in fluid communication with lumen 62 of cannula 48. More particularly, in the present embodiment referring also to FIGS. 4-6, first distal sealant port 70 is located proximal to and adjacent distal end 58 of cannula 48. First distal sealant port 70 is configured as an arcuate channel that connects the pair of passages 64-1, 64-2 of first longitudinal sealant passage 64 at distal portion 56.

Referring to FIGS. 3-9, second longitudinal sealant passage 66 has a second proximal sealant port 72 and a second distal sealant port 74. Second proximal sealant port 72 is coupled in fluid communication with second cannula hub port 52 of cannula hub 46. In the present embodiment, second proximal sealant port 72 is configured as an arcuate opening that connects the individual passages 66-1, 66-2 of the pair of passages 66-1, 66-2 of second longitudinal sealant passage 66 together in fluid communication at proximal portion 54, and as best shown in FIG. 3, connects the pair of passages 66-1, 66-2 to second cannula hub port 52 of cannula hub 46 in fluid communication.

Accordingly, referring to FIGS. 1-3, second proximal sealant port 72 is coupled via second cannula hub port 52 of cannula hub 46 and flexible tube 18 to, and in fluid communication with, second applicator port 30 of second sealant component chamber 26 that carries second sealant component 22 of the multi-component sealant. Thus, second proximal sealant port 72 of second longitudinal sealant passage 66 is configured for fluid communication with second applicator port 30 of second sealant component chamber 26 and with second sealant component 22 of the multi-component sealant.

Referring to FIGS. 7 and 9, second distal sealant port 74 of second longitudinal sealant passage 66 is located at distal portion 56 in fluid communication with lumen 62 of cannula 48. More particularly, in the present embodiment, second distal sealant port 74 is located proximal to and adjacent distal end 58 of cannula 48. Second distal sealant port 70 is configured as an arcuate channel that connects the pair of passages 64-1, 64-2 of first longitudinal sealant passage 64 at distal portion 56.

Referring to FIG. 9, each of first distal sealant port 70 and second distal sealant port 74 is located at distal portion 56 of cannula 48 and extends to lumen 62 of cannula 48. In the present embodiment, for example, first distal sealant port 70 is diametrically opposed to second distal sealant port 74 across lumen 62 of cannula 48. Referring to FIGS. 4-8, each of first distal sealant port 70 and second distal sealant port 74 is configured so as to facilitate fluid communication of first sealant component 20 and second sealant component 22 of the multi-component sealant with a longitudinally positionable stylet 84 of stylet assembly 42, as described in more detail below.

Referring to FIGS. 3-6, stylet assembly 42 includes a stylet advance hub 80, a stylet intermediate hub 82, and a stylet 84.

Stylet advance hub 80 is fixedly connected to stylet 84, e.g., by a press fit or by overmolding. Stylet advance hub 80 has a hub body 80-1 and a female threaded portion 80-2 internal to hub body 80-1. Hub body 80-1 is fixedly connected to stylet 84, e.g., by a press fit or by overmolding.

Stylet intermediate hub 82 is configured to be threadably interposed between, and threadably coupled to each of, cannula hub 46 and stylet advance hub 80. Stylet intermediate hub 82 has a hub body 82-1, a male threaded portion 82-2, and a female threaded portion 82-3. Male threaded portion 82-2 extends proximally from hub body 82-1, e.g., toward stylet advance hub 80. Female threaded portion 82-3 is internal to hub body 82-1. Male threaded portion 82-2 of stylet intermediate hub 82 is configured to threadably engage female threaded portion 80-2 of stylet advance hub 80, and female threaded portion 82-3 of stylet intermediate hub 82 is configured to threadably engage male threaded portion 46-2 of cannula hub 46. Stated differently, female threaded portion 80-2 of stylet advance hub 80 is configured to threadably engage male threaded portion 82-2 of stylet intermediate hub 82, and male threaded portion 46-2 of cannula hub 46 is configured to threadably engage female threaded portion 82-3 of stylet intermediate hub 82.

Stylet assembly 42 is threadably connectable to cannula assembly 40, wherein female threaded portion 82-3 of stylet intermediate hub 82 may be partially or fully threadably engaged with, e.g., tightened on, male threaded portion 46-2 of cannula hub 46. Also, female threaded portion 80-2 of stylet advance hub 80 is adjustably and threadably engaged with male threaded portion 82-2 of stylet intermediate hub 82.

A longitudinal position of stylet advance hub 80 and stylet 84 is adjustable relative to stylet intermediate hub 82, and in turn, is adjustable relative to cannula assembly 40 (i.e., cannula hub 46 and/or cannula 48), by user rotation of stylet advance hub 80 relative to stylet intermediate hub 82. More particularly, with reference to FIGS. 4-6, each of female threaded portion 80-2 of stylet advance hub 80 and male threaded portion 82-2 of stylet intermediate hub 82 has a thread pitch of a first distance 86 to effect a rotational translation of stylet advance hub 80 and stylet 84 relative to stylet intermediate hub 82 by a second distance 88. Thus, stylet 84 is configured for longitudinal movement in lumen 62 of cannula 48 (see also FIGS. 7-9).

Figure 4:
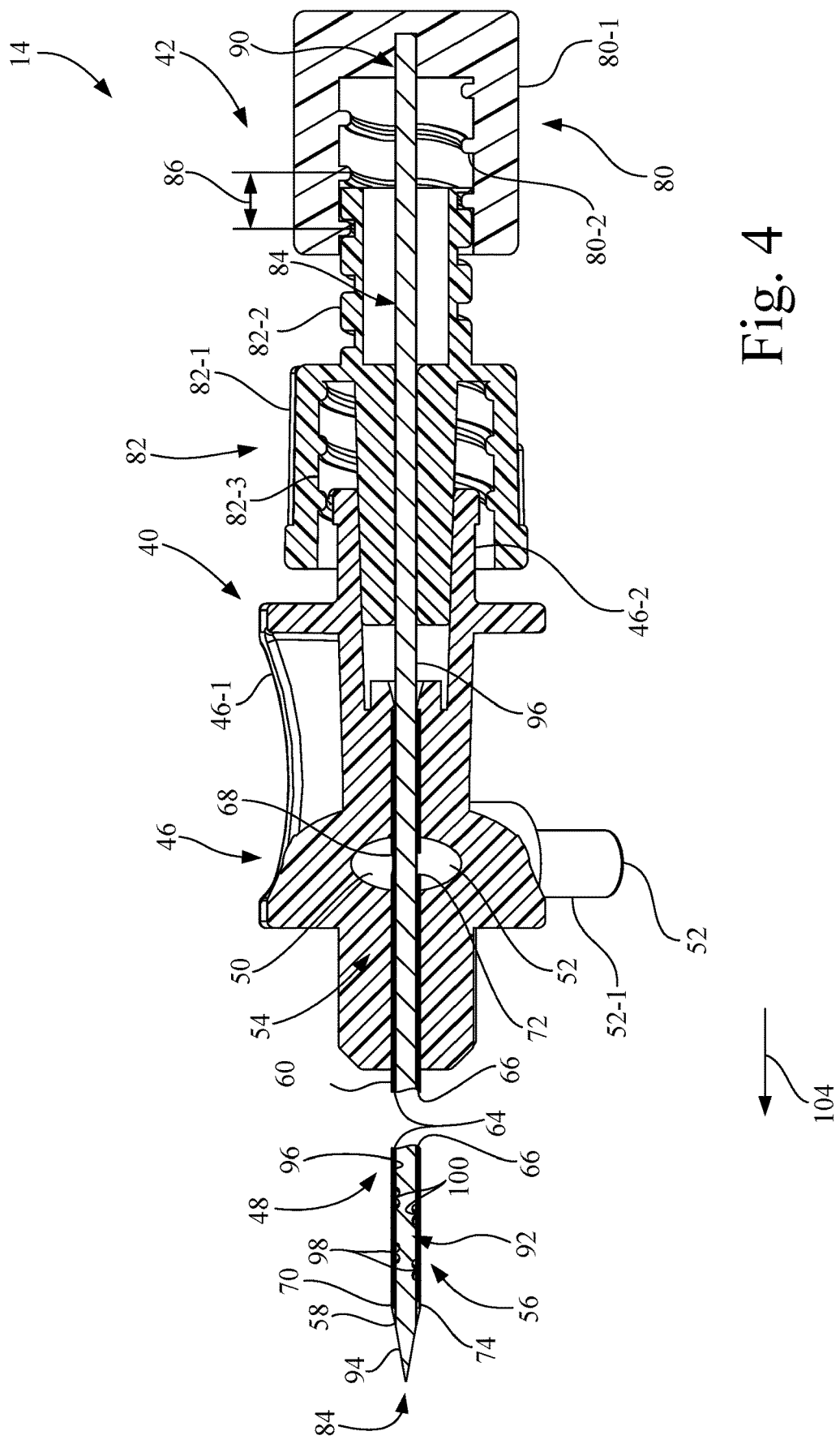
FIG. 4 is an enlarged section view of the sealant injection needle assembly of FIG. 1, taken along line 4-4 of FIG. 1, showing the cannula assembly and the stylet assembly, and with the stylet retracted and with the safety removed.
Figure 5:
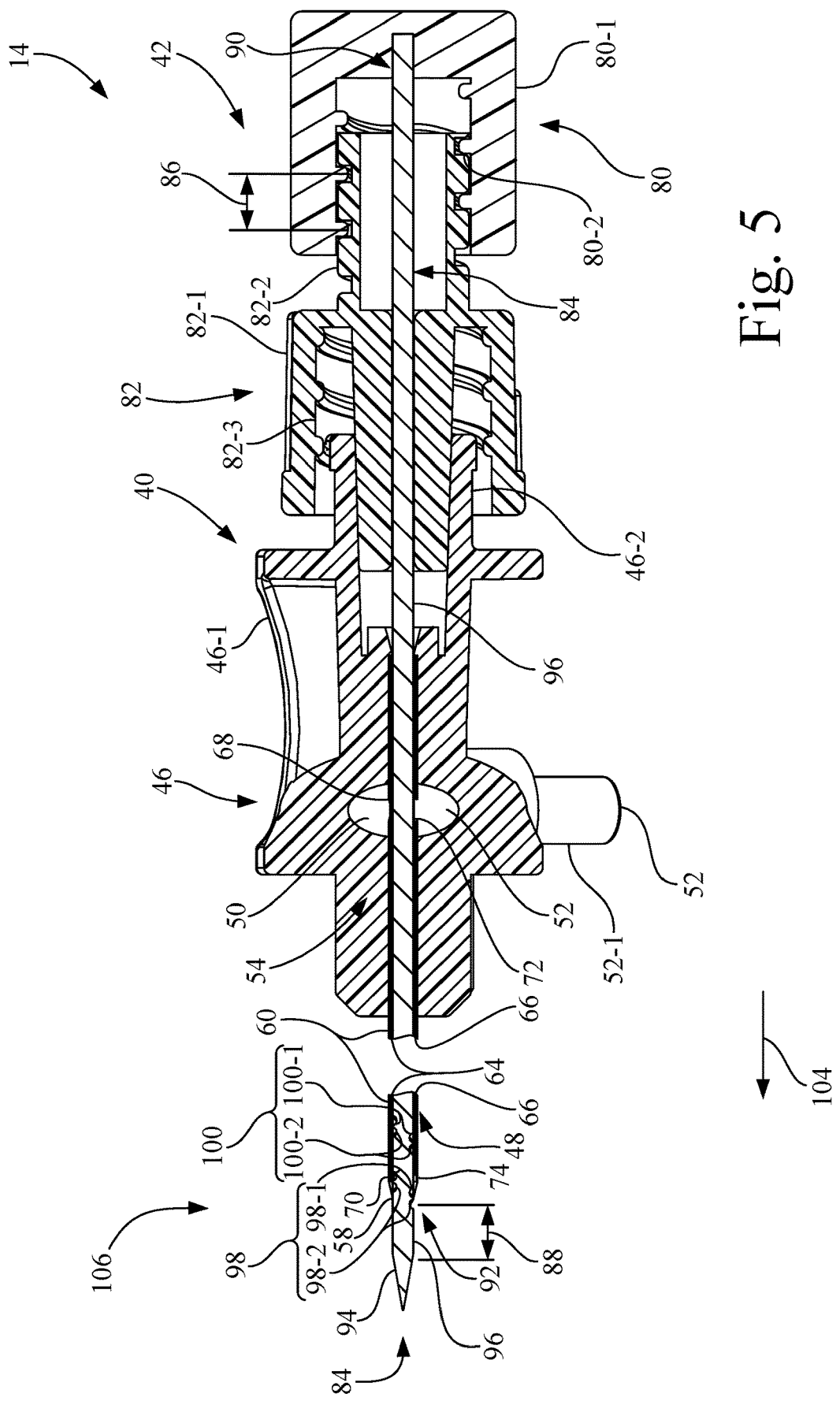
FIG. 5 shows the enlarged section view of the sealant injection needle assembly of FIG. 4, with the stylet advanced to a first stage position.
Figure 6:
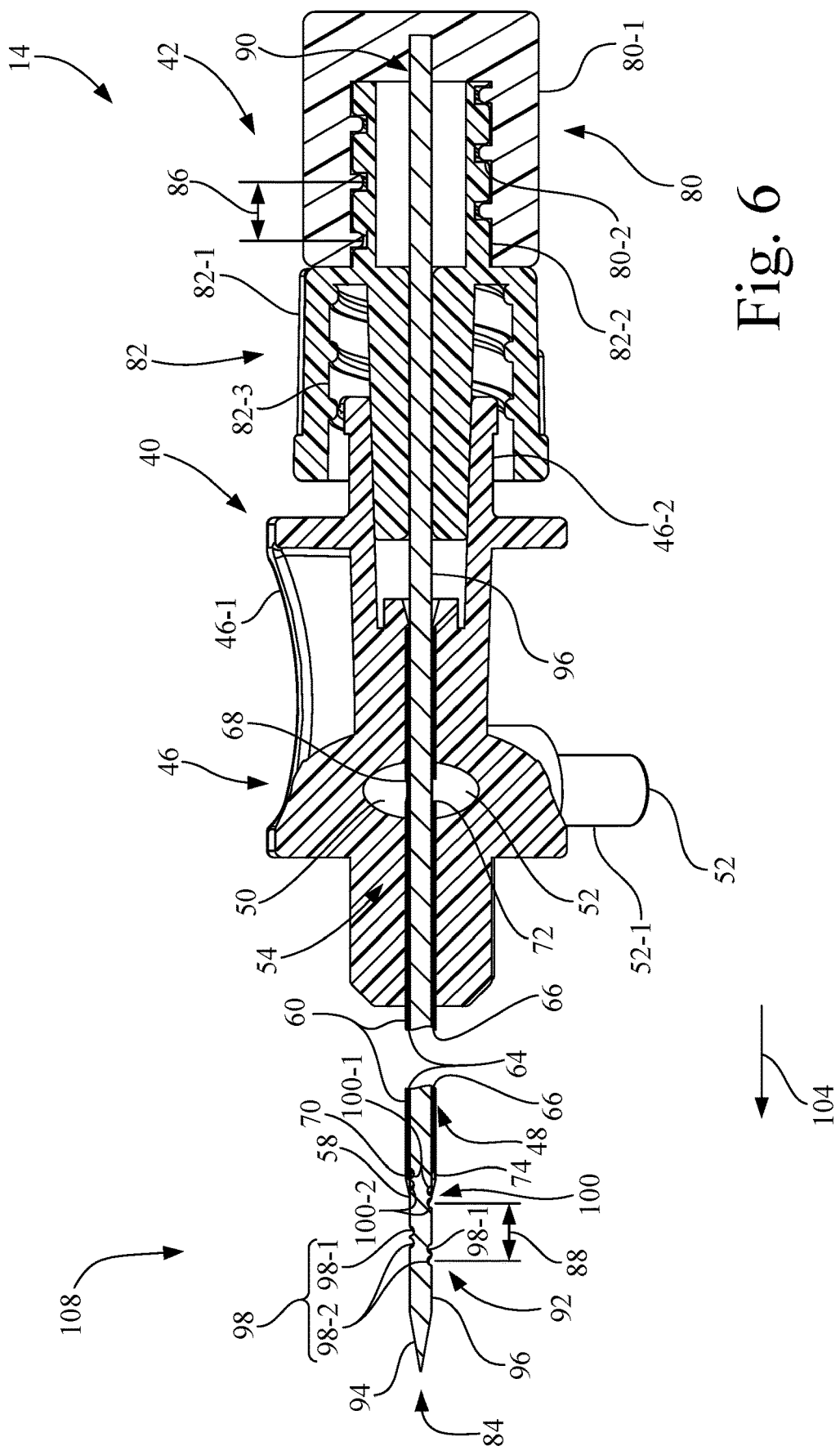
FIG. 6 shows the enlarged section view of the sealant injection needle assembly of FIGS. 4 and 5, with the stylet further advanced to a second stage position.

In the present embodiment, as best shown in FIGS. 4-6, stylet 84 is an elongate solid member having a proximal end portion 90 and a distal end portion 92. Stylet advance hub 80 is fixedly attached to proximal end portion 90 of stylet 84. Distal end portion 92 of stylet 84 has a closed needle tip 94. Moreover, with reference also to FIGS. 10 and 11, in accordance with an aspect of the present invention disclosure, stylet 84 has an outer surface 96 that includes a first exterior circumvolving channel 98 and second exterior circumvolving channel 100 that are located in distal end portion 92 of stylet 84 proximal to the closed needle tip 94.

First exterior circumvolving channel 98 is longitudinally spaced apart from second exterior circumvolving channel 100 along a longitudinal extent of stylet 84, wherein a separation region 102 longitudinally extends between first exterior circumvolving channel 98 and second exterior circumvolving channel 100. Separation region 102 both mechanically and fluidically separates first exterior circumvolving channel 98 from second exterior circumvolving channel 100. In the present embodiment, first exterior circumvolving channel 98 is in the form of a first helix channel (e.g., having a somewhat X-like shape along stylet 84), and second exterior circumvolving channel 100 is in the form of a second helix channel (e.g., having a somewhat X-like shape along stylet 84), with separation region 102 longitudinally extending between the first helix channel and the second helix channel.

Referring again to FIGS. 4-6, female threaded portion 80-2 of stylet advance hub 80 has a thread pitch of first distance 86 to effect a rotational translation of stylet advance hub 80 and stylet 84 by second distance 88 (see FIG. 6). Thus, female threaded portion 80-2 of stylet advance hub 80 is configured such that one full rotation of stylet advance hub 80 results in a longitudinal movement of stylet 84 by second distance 88, and accordingly, results on a longitudinal and simultaneous movement of each of first exterior circumvolving channel 98 and second exterior circumvolving channel 100 of stylet 84 by second distance 88. In the present embodiment, first distance 86 and second distance 88 are equal, and may be a distance, for example, in a range of 1.0 millimeter to 3 millimeters.

In the description that follows, referring to FIGS. 4-7, it is noted that first exterior circumvolving channel 98 is distal to second exterior circumvolving channel 100 with reference to a distal direction 104, such that first exterior circumvolving channel 98 will first be exposed beyond the distal extend of distal end 58 of cannula 48 prior to second exterior circumvolving channel 100 being exposed beyond the distal extend of distal end 58 of cannula 48, so as to define two sequential stages of operation.

More particularly, with reference to FIGS. 5 and 6, stylet 84 has a first stage position 106 and a second stage position 108.

Referring to FIG. 5, with further reference to FIGS. 7, 8, 10 and 11, when stylet 84 is in first stage position 106, as depicted in FIG. 5, each of first distal sealant port 70 and second distal sealant port 74, i.e., both, of cannula 48 is in fluid communication with an aft portion 98-1 of first exterior circumvolving channel 98 of stylet 84, and a fore portion 98-2 of first exterior circumvolving channel 98 of stylet 84 is positioned distal to distal end 58 of cannula 48. Stated differently, when stylet 84 is in first stage position 106, first exterior circumvolving channel 98 of stylet 84 is in fluid communication with both of first distal sealant port 70 and second distal sealant port 74 of cannula 48.

Accordingly, referring again also to FIG. 1, a first actuation (e.g., a partial depressing) of plunger handle 38 of sealant applicator device 12 with stylet 84 in first stage position 106 results in the transport first sealant component 20 and second sealant component 22 to first exterior circumvolving channel 98 of stylet 84, wherein first exterior circumvolving channel 98 facilitates the comingling of first sealant component 20 and second sealant component 22 in first exterior circumvolving channel 98 to form the multi-component sealant and, in turn, the comingled multi-component sealant is delivered from the fore portion 98-2 of first exterior circumvolving channel 98 of stylet 84 into the patient.

Referring to FIG. 6, with further reference to FIGS. 7, 8, 10 and 11, when stylet 84 is in second stage position 108, as depicted in FIG. 6, each of first distal sealant port 70 and second distal sealant port 74 of cannula 48 is in fluid communication with an aft portion 100-1 of second exterior circumvolving channel 100 of stylet 84, and a fore portion 100-2 of second exterior circumvolving channel 100 of stylet 84 is positioned distal to distal end 58 of cannula 48. Stated differently, when stylet 84 is in second stage position 108, second exterior circumvolving channel 100 of stylet 84 is in fluid communication with both of first distal sealant port 70 and second distal sealant port 74 of cannula 48.

Accordingly, referring again also to FIG. 1, a second actuation (e.g., a second partial depressing) of plunger handle 38 of sealant applicator device 12 with stylet 84 in second stage position 108 results in the transport of first sealant component 20 and second sealant component 22 through stylet 84 to second exterior circumvolving channel 100 of stylet 84, wherein second exterior circumvolving channel 100 facilitates the comingling of first sealant component 20 and second sealant component 22 in second exterior circumvolving channel 100 to form the multi-component sealant and, in turn, the comingled multi-component sealant is delivered from the fore portion 100-2 of second exterior circumvolving channel 100 of stylet 84 into the patient.

Figure 12:
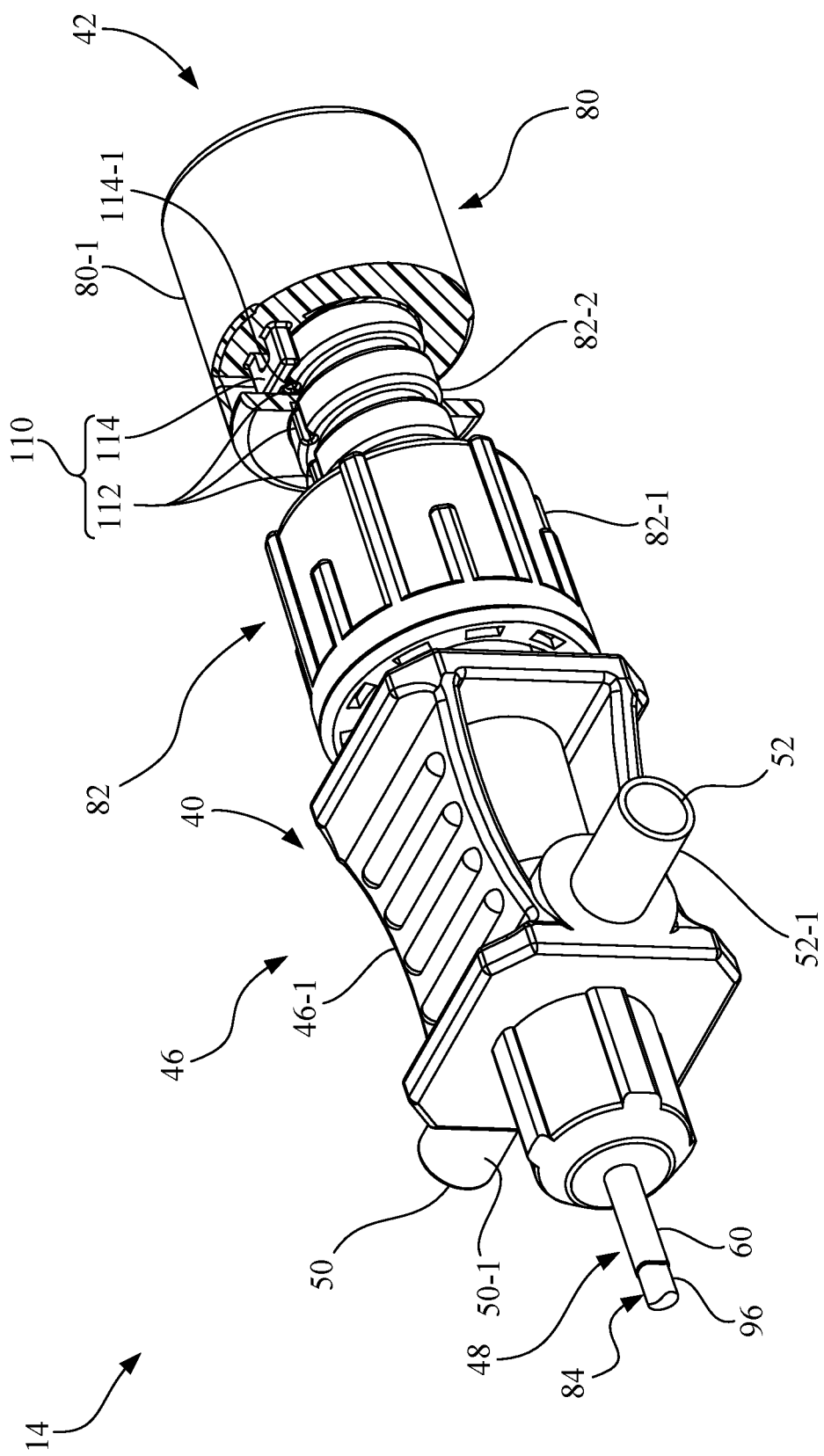
FIG. 12 is an enlarged perspective view for the hubs portion of the sealant injection needle assembly of FIG. 1, with a portion of the stylet advance hub broken away to show a tactile feedback mechanism, according to an aspect of the present disclosure.

Referring now to FIG. 12, stylet advance hub 80 and stylet intermediate hub 82 are configured to provide a tactile feedback to a user for each rotation of stylet advance hub 80 relative to stylet intermediate hub 82. More particularly, stylet advance hub 80 and stylet intermediate hub 82, in combination, include a tactile feedback mechanism 110 configured to provide a tactile feedback to a user for each rotational translation of stylet 84 of the second distance 88. Tactile feedback mechanism 110 may include, for example, a plurality of detents 112 and a cantilever member 114. The plurality of detents 112 may be, for example, a set of linearly arranged and spaced notches in male threaded portion 82-2 of stylet intermediate hub 82. Cantilever member 114 extends, e.g., in distal direction 104, from hub body 80-1 of stylet advance hub 80, and has a cantilever finger 114-1-1 that extends downwardly toward male threaded portion 82-2 of stylet intermediate hub 82. Cantilever finger 114-1-1 is configured to contact and follow the male threaded portion 82-2 of stylet intermediate hub 82, wherein cantilever finger 114-1-1 is biased by cantilever member 114 in a direction toward male threaded portion 82-2 of stylet intermediate hub 82. For each revolution of stylet advance hub 80 relative to stylet intermediate hub 82, cantilever finger 114-1 of stylet advance hub 80 follows male threaded portion 82-2 of stylet intermediate hub 82 to engage one of the plurality of detents 112 formed in male threaded portion 82-2 of stylet intermediate hub 82 to provide a tactile resistance detectable by the user. Thus, the user will know how far stylet 84 has been advanced relative to cannula assembly 40 by sensing the rotational resistance provided by tactile feedback mechanism 110 at each full revolution of stylet advance hub 80 relative to stylet intermediate hub 82.

Referring again to FIGS. 1-3, optionally, safety member 44 may be removably interposed between stylet advance hub 80 and stylet intermediate hub 82. As best shown in FIG. 3, safety member 44 may be, for example, in the form of a spacer having a handle 44-1 and a through hole 44-2 that is sized to receive male threaded portion 82-2 of stylet intermediate hub 82. Alternatively, safety member 44 may be in the form of a clip that is received over male threaded portion 82-2 of stylet intermediate hub 82. Safety member 44 has a thickness selected to space hub body 80-1 of stylet advance hub 80 from hub body 82-1 of stylet intermediate hub 82.

With reference to FIGS. 1, 3, 4, and 7, when safety member 44 is interposed between stylet advance hub 80 and stylet intermediate hub 82, then both of first exterior circumvolving channel 98 and second exterior circumvolving channel 100 of stylet 84 are fully contained within lumen 62 of cannula 48 of cannula assembly 40 (see FIGS. 4, 7 and 8), and thus, first and second distal ports 70, 74 are not radially aligned with any portion of first exterior circumvolving channel 98 and second exterior circumvolving channel 100 of stylet 84. Accordingly, with safety member 44 in place as depicted in FIG. 1, no amount of the multi-component sealant can be delivered from sealant injection needle assembly 14.

However, with reference to FIG. 4, with safety member 44 removed, stylet advance hub 80 may be rotated relative to stylet intermediate hub 82 and cannula assembly 40, so as to re-position stylet 84 in cannula 48, first at first stage position 106 (see FIG. 5), and then at second stage position (see FIG. 6). For example, with further reference to FIG. 12, by rotating stylet advance hub 80 to a first detent effected by tactile feedback mechanism 110, then in turn, stylet 84 is positioned in first stage position 106 (see FIG. 5), each of first distal sealant port 70 and second distal sealant port 74, i.e., both, of cannula 48 is in fluid communication with an aft portion 98-1 of first exterior circumvolving channel 98 of stylet 84, and a fore portion 98-2 of first exterior circumvolving channel 98 of stylet 84 is positioned distal to distal end 58 of cannula 48. As such, at this time, with reference again also to FIG. 1, a first actuation (e.g., a partial depressing) of plunger handle 38 of sealant applicator device 12 with stylet 84 results in the transport first sealant component 20 and second sealant component 22 to first exterior circumvolving channel 98 of stylet 84, wherein first exterior circumvolving channel 98 facilitates the comingling of first sealant component 20 and second sealant component 22 in first exterior circumvolving channel 98 to form the multi-component sealant and, in turn, the comingled multi-component sealant is delivered from the fore portion 98-2 of first exterior circumvolving channel 98 of stylet 84 into the patient.

As soon as the first sealant component 20 and second sealant component 22 are comingled in first exterior circumvolving channel 98, then the multi-component sealant begins to cure. As such, if there is a delay in the lung procedure, e.g., due to imaging or device repositioning, then it is possible that first exterior circumvolving channel 98 may become unusable due to the cured multi-component sealant in the channel. However, advantageously, in accordance with an aspect of the present disclosure, if further sealant delivery is necessary, then stylet advance hub 80 is rotated to a next detent (see FIG. 12), effected by tactile feedback mechanism 110, wherein in turn, stylet 84 is positioned in second stage position 108 (see FIG. 6) to provide a fresh delivery channel.

For example, when stylet 84 is in second stage position 108, as depicted in FIG. 6, then each of first distal sealant port 70 and second distal sealant port 74 of cannula 48 is in fluid communication with an aft portion 100-1 of second exterior circumvolving channel 100 of stylet 84, and a fore portion 100-2 of second exterior circumvolving channel 100 of stylet 84 is positioned distal to distal end 58 of cannula 48, wherein second exterior circumvolving channel 100 facilitates the comingling of first sealant component 20 and second sealant component 22 in second exterior circumvolving channel 100 to form the multi-component sealant and, in turn, the comingled multi-component sealant is delivered from the fore portion 100-2 of second exterior circumvolving channel 100 of stylet 84 into the patient.

In the embodiments described herein, stylet 84 is described as having two spaced exterior circumvolving channels, e.g., including first exterior circumvolving channel 98 and second exterior circumvolving channel 100 of stylet 84 (see, e.g., FIGS. 10 and 11). However, those skilled in the art will recognize that the number of spaced exterior circumvolving channels, i.e., spaced helixes, of stylet 84 may be increased to three, four, or more by simple modifications of the usable threaded length of female threaded portion 80-2 of stylet advance hub 80 and/or male threaded portion 82-2 of stylet intermediate hub 82 (see e.g., FIGS. 4-6), so as to define additional stages of positioning of stylet 84, and in turn, additional stages of delivery of the multi-component sealant to the access passage leading to the lung of the patient.

The following items also relate to the present disclosure.

In one form, the disclosure relates to a sealant injection needle assembly for (use with) a syringe-type applicator having a first sealant component chamber and a second sealant component chamber. The sealant injection needle assembly includes a cannula assembly and a stylet assembly. The cannula assembly may have a cannula hub and a cannula. The cannula may have a lumen and a distal end. The cannula hub is fixedly connected to the cannula. The cannula may have a first longitudinal sealant passage and a second longitudinal sealant passage. The first longitudinal sealant passage may have a first proximal sealant port and a first distal sealant port. The second longitudinal sealant passage may have a second proximal sealant port and a second distal sealant port. The first proximal sealant port may be configured for fluid communication with the first sealant component chamber, and the second proximal sealant port may be configured for fluid communication with the second sealant component chamber. The stylet assembly may have a stylet advance hub and a stylet. The stylet advance hub is fixedly connected to the stylet. The stylet may be configured for longitudinal movement in the lumen of the cannula. The stylet may have a first stage position and a second stage position. The stylet may have an outer surface that includes a first exterior circumvolving channel and a second exterior circumvolving channel. The first exterior circumvolving channel is longitudinally spaced apart from the second exterior circumvolving channel. The stylet assembly may be configured such that, when the stylet is in the first stage position, the first exterior circumvolving channel of the stylet is in fluid communication with both of the first distal sealant port and the second distal sealant port of the cannula, and when the stylet is in the second stage position, the second exterior circumvolving channel of the stylet is in fluid communication with both of the first distal sealant port and the second distal sealant port of the cannula.

In any of the embodiments, the first exterior circumvolving channel may be a first helix channel and the second exterior circumvolving channel may be a second helix channel. A separation region longitudinally extends between the first helix channel and the second helix channel.

In any of the embodiments, the stylet assembly may be configured such that when the stylet is in the first stage position, a fore portion of the first exterior circumvolving channel of the stylet is distal to the distal end of the cannula and an aft portion of the first exterior circumvolving channel of the stylet is in fluid communication with both of the first distal sealant port and the second distal sealant port of the cannula.

In any of the embodiments, the stylet assembly may be configured such that when the stylet is in the second stage position, a fore portion of the second exterior circumvolving channel of the stylet is distal to the distal end of the cannula and an aft portion of the second exterior circumvolving channel of the stylet is in fluid communication with both of the first distal sealant port and the second distal sealant port of the cannula.

In some embodiments, the cannula may have a proximal portion, a distal portion having the distal end, and a side wall that surrounds the lumen, wherein the first longitudinal sealant passage and the second longitudinal sealant passage are located in the side wall of the cannula. Each of the first longitudinal sealant passage and the second longitudinal sealant passage may be configured to extend from the proximal portion to the distal portion.

In any of the embodiments, each of the first distal sealant port and the second distal sealant port of the cannula may be located at the distal portion of the cannula and configured to extend to the lumen of the cannula.

In some embodiments, the first distal sealant port may be diametrically opposed to the second distal sealant port across the lumen of the cannula.

In some embodiments, the stylet may be an elongate solid member having a proximal end portion and a distal end portion. The stylet advance hub may be fixedly attached to the proximal end portion. The distal end portion may have a closed needle tip. The first exterior circumvolving channel and the second exterior circumvolving channel are located in the distal end portion proximal to the closed needle tip.

In some embodiments, a stylet intermediate hub may be threadably coupled to each of the stylet advance hub and the cannula hub.

In any of the embodiments having the stylet intermediate hub, the stylet intermediate hub may have a first male threaded portion and a first female threaded portion. The stylet advance hub may have a second female threaded portion configured to threadably engage the first male threaded portion of the stylet intermediate hub. The cannula hub may have a second male threaded portion configured to threadably engage the first female threaded portion of the stylet intermediate hub.

In the embodiment of the preceding paragraph, the second female threaded portion of the stylet advance hub may have a thread pitch of a first distance (configured) to effect a rotational translation of the stylet advance hub and the stylet by a second distance, and wherein the sealant injection needle is configured such that one full rotation of the stylet advance hub results in a longitudinal movement of each of the first exterior circumvolving channel and the second exterior circumvolving channel of the stylet by the second distance. In some embodiments, optionally, the first distance and the second distance are equal.

In any of the embodiments having the stylet intermediate hub, optionally, the sealant injection needle assembly may comprise a safety member that may be removably interposed between the stylet advance hub and the stylet intermediate hub.

In any of the embodiments having the stylet intermediate hub, optionally, the sealant injection needle assembly may be configured such that the stylet advance hub and stylet intermediate hub in combination comprise a tactile feedback mechanism configured to provide a tactile feedback to a user for each rotational translation of the stylet of the second distance.

The disclosure also concerns an assembly comprising a sealant injection needle assembly as described above, for a lung access procedure (to aid in preventing pneumothorax) and in particular a lung access assembly comprising the sealant injection needle assembly as described above.

In another form, the disclosure relates to a sealant injection needle assembly for ejecting a multi-component sealant. The sealant injection needle assembly may include a cannula having a proximal portion, a distal portion, a distal end, and a side wall that surrounds a lumen. The side wall may have a first longitudinal sealant passage and a second longitudinal sealant passage, wherein each of the first longitudinal sealant passage and the second longitudinal sealant passage extends from the proximal portion to the distal portion. The first longitudinal sealant passage may have a first proximal sealant port and a first distal sealant port. The first proximal sealant port may be configured for fluid communication with a first sealant component of the multi-component sealant. The first distal sealant port is located at the distal portion in fluid communication with the lumen of the cannula. The second longitudinal sealant passage may have a second proximal sealant port and a second distal sealant port. The second proximal sealant port may be configured for fluid communication with a second sealant component of the multi-component sealant. The second distal sealant port is located at the distal portion in fluid communication with the lumen of the cannula. The stylet may be configured for longitudinal movement in the lumen of the cannula between a first stage position and a second stage position. The stylet may have an outer surface that may include a first exterior circumvolving channel and a second exterior circumvolving channel. The first exterior circumvolving channel is longitudinally spaced from the second exterior circumvolving channel. The stylet (sealant injection needle assembly) is configured such that, when the stylet is in the first stage position, each of the first distal sealant port and the second distal sealant port of the cannula is in fluid communication with an aft portion of the first exterior circumvolving channel of the stylet, and a fore portion of the first exterior circumvolving channel of the stylet is positioned distal to the distal end of the cannula. Also, the stylet (sealant injection needle assembly) is configured such that, when the stylet is in the second stage position, each of the first distal sealant port and the second distal sealant port of the cannula is in fluid communication with an aft portion of the second exterior circumvolving channel of the stylet, and a fore portion of the second exterior circumvolving channel of the stylet is positioned distal to the distal end of the cannula.

In the embodiment of the preceding paragraph, the sealant injection needle assembly may comprise a cannula hub fixedly connected to the cannula, a stylet advance hub may be fixedly connected to the stylet, and a stylet intermediate hub may be coupled to each of the stylet advance hub and the cannula hub.

In embodiments that include the stylet intermediate hub, the stylet intermediate hub may have a first male threaded portion and a first female threaded portion. The stylet advance hub may have a second female threaded portion configured to threadably engage the first male threaded portion of the stylet intermediate hub. The cannula hub may have a second male threaded portion configured to threadably engage the first female threaded portion of the stylet intermediate hub. The second female threaded portion of the stylet advance hub may have a thread pitch of a first distance (configured) to effect a rotational translation of the stylet advance hub and the stylet by a second distance, and may be configured such that one full rotation of the stylet advance hub results in a longitudinal movement of each of the first exterior circumvolving channel and the second exterior circumvolving channel of the stylet by the second distance.

In embodiments that include the stylet intermediate hub, the stylet advance hub and the stylet intermediate hub in combination may comprise a tactile feedback mechanism configured to provide a tactile feedback to a user for each rotational translation of the stylet of the second distance.

In embodiments that include the stylet intermediate hub, optionally, the sealant injection needle assembly may comprise a safety member removably interposed between the stylet advance hub and the stylet intermediate hub.

The sealant injection needle assembly for ejecting a multi-component sealant as described above may have the features of items [0065] to [0084] above and/or may be for a lung access procedure and/or be comprised in a lung access assembly.

In another form, the disclosure relates to a sealant delivery apparatus for use in a lung access procedure to aid in preventing pneumothorax. The sealant delivery apparatus may include a sealant applicator device, a cannula assembly, and a stylet assembly. The sealant applicator device may have an actuator, a first sealant component chamber configured to carry a first sealant component of a multi-component sealant, and second sealant component chamber configured to carry a second sealant component of the multi-component sealant. The first sealant component chamber may have a first applicator port, and the second sealant component chamber may have a second applicator port. The cannula assembly may have a cannula hub and a cannula that may have a lumen and a distal end. The cannula hub may be fixedly connected to the cannula. The cannula may be configured to have a first longitudinal sealant passage and a second longitudinal sealant passage. The first longitudinal sealant passage may have a first proximal sealant port and a first distal sealant port. The second longitudinal sealant passage may have a second proximal sealant port and a second distal sealant port. The first proximal sealant port may be configured for fluid communication with the first applicator port of the first sealant component chamber of the sealant applicator device. The second proximal sealant port may be configured for fluid communication with the second applicator port of the second sealant component chamber of the sealant applicator device. The stylet assembly may have a stylet advance hub, a stylet intermediate hub, and a stylet. The stylet intermediate hub may be threadably interposed between the cannula hub and the stylet advance hub. The stylet advance hub may be fixedly connected to the stylet. The stylet may be configured for longitudinal movement in the lumen of the cannula. The stylet may have a first stage position and a second stage position. The stylet has an outer surface that may include a first exterior circumvolving channel and a second exterior circumvolving channel. The first exterior circumvolving channel is longitudinally spaced apart from the second exterior circumvolving channel. The stylet assembly (sealant delivery apparatus) may be configured such that when the stylet is in the first stage position, each of the first distal sealant port and the second distal sealant port of the cannula is in fluid communication with the first exterior circumvolving channel of the stylet, and a fore portion of the first exterior circumvolving channel of the stylet is positioned distal to the distal end of the cannula, and when the stylet is in the second stage position, each of the first distal sealant port and the second distal sealant port of the cannula is in fluid communication with the second exterior circumvolving channel of the stylet, and a fore portion of the second exterior circumvolving channel of the stylet is positioned distal to the distal end of the cannula.

In the embodiment of the preceding paragraph, the stylet intermediate hub may have a first male threaded portion and a first female threaded portion. The stylet advance hub may have a second female threaded portion configured to threadably engage the first male threaded portion of the stylet intermediate hub. The cannula hub may have a second male threaded portion configured to threadably engage the first female threaded portion of the stylet intermediate hub. The second female threaded portion of the stylet advance hub may have a thread pitch of a first distance (configured) to effect a rotational translation of the stylet advance hub and the stylet by a second distance, and may be configured such that one full rotation of the stylet advance hub results in a longitudinal movement of each of the first exterior circumvolving channel and the second exterior circumvolving channel of the stylet by the second distance.

Optionally, the stylet advance hub and stylet intermediate hub in combination may comprise a tactile feedback mechanism configured to provide a tactile feedback to a user for each rotational translation of the stylet of the second distance.

Optionally, the sealant delivery apparatus may comprise a safety member removably interposed between the stylet advance hub and the stylet intermediate hub.

The sealant injection delivery apparatus as described above may have the features of the sealant injection needle assembly as described above and/or may be comprised in a lung access assembly.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A sealant injection needle assembly for use with a syringe-type applicator having a first sealant component chamber and a second sealant component chamber, comprising:
   a cannula assembly having a cannula hub and a cannula, the cannula having a lumen and a distal end, the cannula hub being fixedly connected to the cannula, the cannula having a first longitudinal sealant passage and a second longitudinal sealant passage, the first longitudinal sealant passage having a first proximal sealant port and a first distal sealant port, the second longitudinal sealant passage having a second proximal sealant port and a second distal sealant port, the first proximal sealant port configured for fluid communication with the first sealant component chamber, and the second proximal sealant port configured for fluid communication with the second sealant component chamber; and
   a stylet assembly having a stylet advance hub and a stylet, the stylet advance hub being fixedly connected to the stylet, the stylet configured for longitudinal movement in the lumen of the cannula, the stylet having a first stage position and a second stage position, the stylet having an outer surface that includes a first exterior circumvolving channel and a second exterior circumvolving channel, wherein the first exterior circumvolving channel is longitudinally spaced apart from the second exterior circumvolving channel, wherein:
   when the stylet is in the first stage position, the first exterior circumvolving channel of the stylet is in fluid communication with both of the first distal sealant port and the second distal sealant port of the cannula; and
   when the stylet is in the second stage position, the second exterior circumvolving channel of the stylet is in fluid communication with both of the first distal sealant port and the second distal sealant port of the cannula.

2. The sealant injection needle assembly according to claim 1, wherein the first exterior circumvolving channel is a first helix channel and the second exterior circumvolving channel is a second helix channel, and further comprising a separation region longitudinally extending between the first helix channel and the second helix channel.

3. The sealant injection needle assembly according to claim 1, wherein when the stylet is in the first stage position, a fore portion of the first exterior circumvolving channel of the stylet is distal to the distal end of the cannula and an aft portion of the first exterior circumvolving channel of the stylet is in fluid communication with both of the first distal sealant port and the second distal sealant port of the cannula.

4. The sealant injection needle assembly according to claim 1, wherein when the stylet is in the second stage position, a fore portion of the second exterior circumvolving channel of the stylet is distal to the distal end of the cannula and an aft portion of the second exterior circumvolving channel of the stylet is in fluid communication with both of the first distal sealant port and the second distal sealant port of the cannula.

5. The sealant injection needle assembly according to claim 1, wherein the cannula has a proximal portion, a distal portion having the distal end, and a side wall that surrounds the lumen, wherein the first longitudinal sealant passage and the second longitudinal sealant passage are located in the side wall of the cannula, and wherein each of the first longitudinal sealant passage and the second longitudinal sealant passage extends from the proximal portion to the distal portion.

6. The sealant injection needle assembly according to claim 5, wherein each of the first distal sealant port and the second distal sealant port is located at the distal portion of the cannula and extends to the lumen of the cannula.

7. The sealant injection needle assembly according to claim 1, wherein the first distal sealant port is diametrically opposed to the second distal sealant port across the lumen of the cannula.

8. The sealant injection needle assembly according to claim 1, wherein the stylet is an elongate solid member having a proximal end portion and a distal end portion, the stylet advance hub being fixedly attached to the proximal end portion, the distal end portion having a closed needle tip, the first exterior circumvolving channel and the second exterior circumvolving channel being located in the distal end portion proximal to the closed needle tip.

9. The sealant injection needle assembly according to claim 1, comprising a stylet intermediate hub threadably coupled to each of the stylet advance hub and the cannula hub.

10. The sealant injection needle assembly according to claim 9, wherein:
the stylet intermediate hub has a first male threaded portion and a first female threaded portion;
the stylet advance hub has a second female threaded portion configured to threadably engage the first male threaded portion of the stylet intermediate hub; and
the cannula hub has a second male threaded portion configured to threadably engage the first female threaded portion of the stylet intermediate hub.

11. The sealant injection needle assembly according to claim 10, wherein the second female threaded portion of the stylet advance hub has a thread pitch of a first distance to effect a rotational translation of the stylet advance hub and the stylet by a second distance, and configured such that one full rotation of the stylet advance hub results in a longitudinal movement of each of the first exterior circumvolving channel and the second exterior circumvolving channel of the stylet by the second distance, and wherein the first distance and the second distance are equal.

12. The sealant injection needle assembly according to claim 9, further comprising a safety member removably interposed between the stylet advance hub and the stylet intermediate hub.

13. The sealant injection needle assembly according to claim 11, wherein the stylet advance hub and stylet intermediate hub in combination comprise a tactile feedback mechanism configured to provide a tactile feedback to a user for each rotational translation of the stylet of the second distance.

14. A sealant injection needle assembly for ejecting a multi-component sealant, comprising:
a cannula having a proximal portion, a distal portion, a distal end, and a side wall that surrounds a lumen, the side wall having a first longitudinal sealant passage and a second longitudinal sealant passage, wherein each of the first longitudinal sealant passage and the second longitudinal sealant passage extends from the proximal portion to the distal portion, wherein:
the first longitudinal sealant passage has a first proximal sealant port and a first distal sealant port, the first proximal sealant port configured for fluid communication with a first sealant component of the multi-component sealant, the first distal sealant port being located at the distal portion in fluid communication with the lumen of the cannula, and
the second longitudinal sealant passage has a second proximal sealant port and a second distal sealant port, the second proximal sealant port configured for fluid communication with a second sealant component of the multi-component sealant, the second distal sealant port being located at the distal portion in fluid communication with the lumen of the cannula; and
a stylet configured for longitudinal movement in the lumen of the cannula between a first stage position and a second stage position, the stylet having an outer surface that includes a first exterior circumvolving channel and a second exterior circumvolving channel, wherein the first exterior circumvolving channel is longitudinally spaced from the second exterior circumvolving channel, and wherein:
when the stylet is in the first stage position, each of the first distal sealant port and the second distal sealant port of the cannula is in fluid communication with an aft portion of the first exterior circumvolving channel of the stylet, and a fore portion of the first exterior circumvolving channel of the stylet is positioned distal to the distal end of the cannula, and
when the stylet is in the second stage position, each of the first distal sealant port and the second distal sealant port of the cannula is in fluid communication with an aft portion of the second exterior circumvolving channel of the stylet, and a fore portion of the second exterior circumvolving channel of the stylet is positioned distal to the distal end of the cannula.

15. The sealant injection needle assembly according to claim 14, comprising:
a cannula hub fixedly connected to the cannula;
a stylet advance hub being fixedly connected to the stylet; and
a stylet intermediate hub coupled to each of the stylet advance hub and the cannula hub.

16. The sealant injection needle assembly according to claim 15, wherein:
the stylet intermediate hub has a first male threaded portion and a first female threaded portion;
the stylet advance hub has a second female threaded portion configured to threadably engage the first male threaded portion of the stylet intermediate hub; and
the cannula hub has a second male threaded portion configured to threadably engage the first female threaded portion of the stylet intermediate hub, wherein:
the second female threaded portion of the stylet advance hub has a thread pitch of a first distance to effect a rotational translation of the stylet advance hub and the stylet by a second distance, and configured such that one full rotation of the stylet advance hub results in a longitudinal movement of each of the first exterior circumvolving channel and the second exterior circumvolving channel of the stylet by the second distance.

17. The sealant injection needle assembly according to claim 15, wherein the stylet advance hub and stylet intermediate hub in combination comprise a tactile feedback mechanism configured to provide a tactile feedback to a user for each rotational translation of the stylet of the second distance.

18. The sealant injection needle assembly according to claim 15, further comprising a safety member removably interposed between the stylet advance hub and the stylet intermediate hub.

19. A sealant delivery apparatus for use in a lung access procedure to aid in preventing pneumothorax, comprising:
- a sealant applicator device having an actuator, a first sealant component chamber configured to carry a first sealant component of a multi-component sealant, and second sealant component chamber configured to carry a second sealant component of the multi-component sealant, the first sealant component chamber having a first applicator port, and the second sealant component chamber having a second applicator port;
- a cannula assembly having a cannula hub and a cannula having a lumen and a distal end, the cannula hub being fixedly connected to the cannula, the cannula configured to have a first longitudinal sealant passage and a second longitudinal sealant passage, the first longitudinal sealant passage having a first proximal sealant port and a first distal sealant port, the second longitudinal sealant passage having a second proximal sealant port and a second distal sealant port, the first proximal sealant port configured for fluid communication with the first applicator port of the first sealant component chamber of the sealant applicator device, and the second proximal sealant port configured for fluid communication with the second applicator port of the second sealant component chamber of the sealant applicator device; and
- a stylet assembly having a stylet advance hub, a stylet intermediate hub, and a stylet, the stylet intermediate hub being threadably interposed between the cannula hub and the stylet advance hub, the stylet advance hub being fixedly connected to the stylet, the stylet configured for longitudinal movement in the lumen of the cannula, the stylet having a first stage position and a second stage position, the stylet having an outer surface that includes a first exterior circumvolving channel and a second exterior circumvolving channel, wherein the first exterior circumvolving channel is longitudinally spaced apart from the second exterior circumvolving channel, and wherein:
  - when the stylet is in the first stage position, each of the first distal sealant port and the second distal sealant port of the cannula is in fluid communication with the first exterior circumvolving channel of the stylet, and a fore portion of the first exterior circumvolving channel of the stylet is positioned distal to the distal end of the cannula, and
  - when the stylet is in the second stage position, each of the first distal sealant port and the second distal sealant port of the cannula is in fluid communication with the second exterior circumvolving channel of the stylet, and a fore portion of the second exterior circumvolving channel of the stylet is positioned distal to the distal end of the cannula.

20. The sealant delivery apparatus according to claim 19, wherein the stylet intermediate hub has a first male threaded portion and a first female threaded portion, the stylet advance hub has a second female threaded portion configured to threadably engage the first male threaded portion of the stylet intermediate hub, and the cannula hub has a second male threaded portion configured to threadably engage the first female threaded portion of the stylet intermediate hub, and
- the second female threaded portion of the stylet advance hub has a thread pitch of a first distance to effect a rotational translation of the stylet advance hub and the stylet by a second distance, and configured such that one full rotation of the stylet advance hub results in a longitudinal movement of each of the first exterior circumvolving channel and the second exterior circumvolving channel of the stylet by the second distance.

21. The sealant delivery apparatus according to claim 19, wherein the stylet advance hub and stylet intermediate hub in combination comprise a tactile feedback mechanism configured to provide a tactile feedback to a user for each rotational translation of the stylet of the second distance.

22. The sealant delivery apparatus according to claim 19, further comprising a safety member removably interposed between the stylet advance hub and the stylet intermediate hub.

* * * * *